July 21, 1964  D. D. MISHLER  3,141,524
BRAKE LINING WEAR WARNING MECHANISM AND METHOD
OF GENERATING LINING WEAR WARNING SIGNALS
Filed June 22, 1962
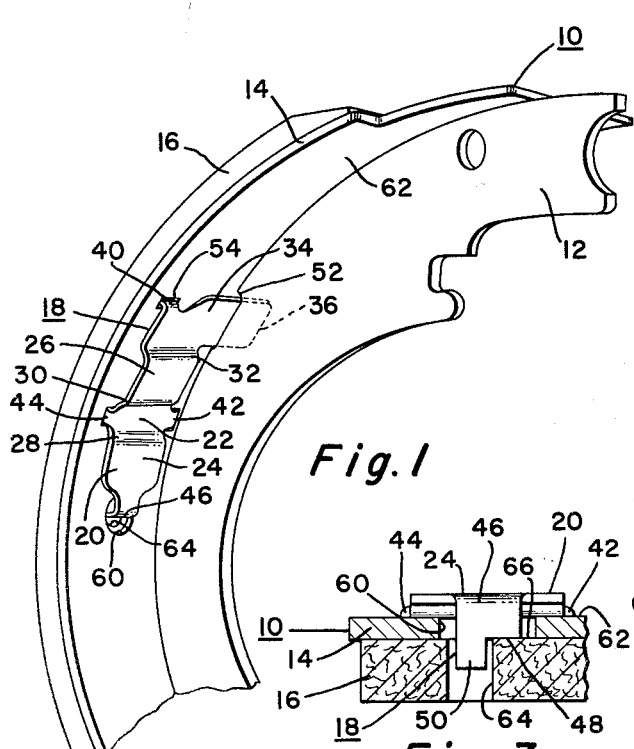
Fig. 1
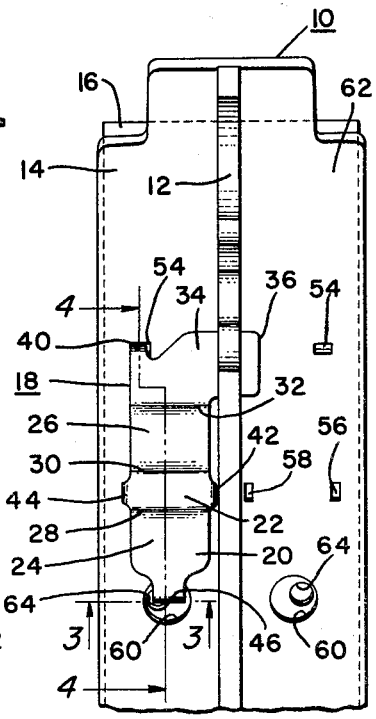
Fig. 2
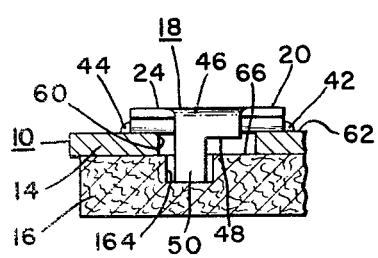
Fig. 3
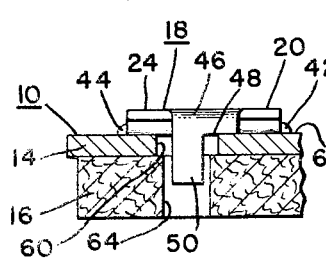
Fig. 7
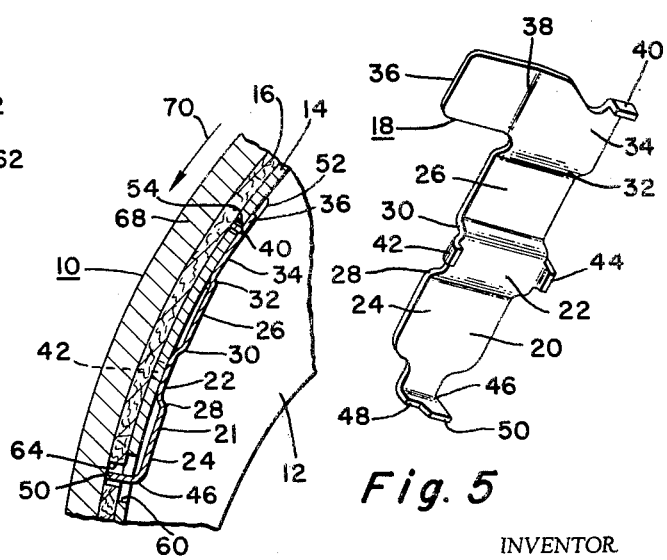
Fig. 6
Fig. 4
Fig. 5
INVENTOR
David D. Mishler
BY
O.D. McGraw
His Attorney United States Patent Office 3,141,524
Patented July 21, 1964

3,141,524
BRAKE LINING WEAR WARNING MECHANISM AND METHOD OF GENERATING LINING WEAR WARNING SIGNALS
David D. Mishler, West Milton, Ohio, assignor to General Motors Corporation, Detroit, Mich., a corporation of Delaware
Filed June 22, 1962, Ser. No. 204,348
8 Claims. (Cl. 188—1)

The invention relates to a mechanism and method for warning a vehicle operator when the brake lining on any brake of the vehicle has worn to the point where it requires replacement in the immediate future. Numerous warning systems have been proposed in the past which sense in some manner the wear of the brake lining and provide a signal to the vehicle operator. It has been common to suggest the use of electrical contacts embedded in the shoe which are closed by contact with the brake drum upon sufficient lining wear and complete a circuit to a warning light visible by the vehicle operator. It has also been suggested that materials be embedded in the lining which cause the brake to smoke or to give off a distinctive odor when the lining has worn to the extent that the embedded material contacts the brake drum during brake application. Such proposals have obvious disadvantages of cost and dependability as well as, in some instances, unsatisfactory methods of signaling lining wear.

It is now proposed to provide a lining wear signaling device which may be utilized on brakes without major modification, which is simple and economical to manufacture and install, and which provides a warning signal audible to the vehicle operator. The signaling device requires no outside source of energy such as an electrical circuit, and is not subject to deterioration while inactively waiting until brake linings are worn sufficiently to activate it. Mechanisms embodying the invention utilize a cantilever spring mounted on the brake shoe and extending a predetermined distance into the brake lining so that the spring may engage the brake drum when the linings have worn a predetermined amount and will be caused to vibrate due to movement of the brake drum against the spring. The signal is operative only when the vehicle is in motion, and in its preferred form is operative only when the vehicle brakes are applied. The vibrating spring may be tuned to provide a range of sound so as to be readily recognizable by the operator as a brake lining wear warning sound. The device will not interfere with the operation of the vehicle brakes even after the warning device becomes operative. Devices may be installed in one or more positions on each brake shoe in accordance with the expected wear pattern so that the warning signal will be generated when the lining has been worn to the minimum desirable thickness at the point or points of greatest wear.

Devices embodying the invention may be constructed and installed so as to produce a sound of predetermined pitch when the signal is first generated and to change the pitch after a predetermined amount of additional brake lining wear occurs. Such devices may thus serve to provide an initial warning followed by a second warning that the brake lining urgently requires replacement. This is accomplished by mounting the cantilever spring so that it has a first vibrating length which is operative during the first portion of the signaling operation and which length is changed by additional wear of the lining to provide a different vibrating length and therefore change the pitch or tone of the signaling device.

In the drawings:

FIGURE 1 is a perspective view with parts broken away of a brake shoe assembly having a mechanism embodying the invention installed thereon.

FIGURE 2 is a plan view taken approximately from the center of curvature of the brake shoe assembly of FIGURE 1 and illustrating the warning device substantially in plan view.

FIGURE 3 is a cross section view of the brake shoe assembly having parts broken away and taken in a direction of arrows 3—3 of FIGURE 2.

FIGURE 4 is a sectional view of the brake assembly with parts broken away and taken in the direction of arrows 4—4 of FIGURE 2.

FIGURE 5 is a perspective view of the spring signaling device embodying the invention and showing the side of the device adjacent the brake shoe.

FIGURE 6 is a cross section view similar to FIGURE 3 and showing a modification of the device embodying the invention.

FIGURE 7 is another cross section view similar to FIGURE 3 and showing another modification of the device embodying the invention.

The brake shoe assembly 10 includes a web 12, a lining mounting plate 14 and a lining 16 which may be assembled in the usual manner. The warning device 18 is shown in FIGURES 1 and 2 in the installed position. Warning device 18 is suitably formed of a spring material. It may be stamped and shaped from a metallic sheet, for example, and properly heat treated to achieve the desirable spring qualities.

The device 18 includes a generally longitudinal body section 20 having a central flat 22 joined to oppositely disposed flats 24 and 26 by bends 28 and 30 so that flats 24 and 26 are substantially in the same plane and spaced from the plane of flat 22. One end of the device 18 adjacent flat 26 is bent at 32 to provide another flat 34 which is substantially in the same plane as flat 22. Flat 22 provides a center fulcrum body section and flat 34 provides an end fulcrum body section. A locating and holding tab 36 extends transversely outward from flat 34 and is joined thereto by a slight bend 38 so that the tab is in a plane intermediate the plane containing flats 24 and 26 and the other plane containing flats 22 and 34. In some installations it may not be necessary to provide bend 38, and tab 36 may be in the same plane as flat 34.

A locating tab 40 may be provided at the end of flat 34 and struck downwardly at a substantially right angle to the flat 34 and in the direction opposite that of bend 32 in relation to flat 34. Similar locating tabs 42 and 44 are struck from the plane of flat 22 on opposite sides thereof.

Flat 24 has an outer end opposite flat 22 which is formed to provide a brake drum engaging tab 46. Tab 46 is illustrated as being substantially narrower than flat 24 and substantially longer than the locating tabs 40, 42 and 44. In the preferred embodiments, tab 46 is provided with a shoulder 48 beyond which a neck 50 extends. In general, locating tabs 40, 42 and 44 will extend beyond the surface of their adjacent flats a distance approximately equal to the thickness of the shoe mounting plate 14. On the other hand, the shoulder 48 will extend beyond the surface of flat 24 a distance somewhat greater than the thickness of the shoe mounting plate 14, and neck 50 will extend still further beyond the surface of flat 24.

The brake shoe web 12 is provided with a suitable aperture 52 which may be formed by removing a small section of the web before the web is assembled to the shoe mounting plate 14. Aperture 52 is therefore within the bounds of web 12 but has one side thereof formed by the inner surface of the shoe mounting plate 14. Aperture 52 is at least as long as the width of the locating and holding tab 36 and has a depth which is equal to or only slightly greater than the thickness of the tab 36. Tab 36 extends through aperture 52 and acts to hold flat 34 lightly under spring force against mounting plate 14. It also resiliently holds flat 22 against mounting plate 14.

Locating apertures 54, 56 and 58 are also provided through the mounting plate 14 so that locating tabs 40, 42 and 44 are respectively received in these apertures as shown in FIGURES 1 and 2.

It may be desirable to provide additional apertures 54, 56 and 58 in mirror image relation on the other side of the web 12 from that shown in FIGURE 1 wherein the warning device 18 is mounted. Such apertures are shown in FIGURE 2. Thus a warning device of mirror image to that of device 18 may be installed on the other side of the shoe mounting plate 14 if desired.

Another aperture 60 is provided through the mounting plate 14 so that the engaging tab 46 is freely received therethrough as disclosed in FIGURES 1, 2 and 3. In the modification shown in FIGURE 7 aperture 60 freely receives the neck 50 of engaging tab 46 but is positioned so that shoulder 48 engages the radially inner surface 62 of mounting plate 14. In the embodiment shown in FIGURE 3, the brake lining 16 is provided with an aperture 64 extending through the lining and in such alignment with mounting plate aperture 60 as to freely receive the neck 50 of engaging tab 46 while having the shoulder 48 of the tab 46 engaging the radially inner surface 66 of the lining. Thus the length of tab neck 50 from the edge of shoulder 48 determines the thickness of lining 16 at which it is desirable for the warning device to become operative.

As shown in FIGURE 3, the lining 16 has not been worn to any appreciable extent during its braking actions wherein it engages brake drum 68. FIGURE 4 illustrates the point at which the linking 16 has become sufficiently worn to be reduced in thickness until the end of tab neck 50 engages the braking surface of the drum 68. At this time, when the vehicle brake is engaged so that lining 16 is in frictional engagement with the drum 68, and with the drum rotating in either direction, with the forward direction being shown by arrow 70, the engagement of the end of the tab 46 with the drum causes the warning device 18 to act as a vibrating cantilever spring about the flat 22 which is in engagement with the inner surface 62 of the mounting plate 14. Flat 22 is held in engagement by spring action of the locating tab 36 firmly engaging aperture 52, and the spring action of flat 26. The scraping of tab 46 against drum 68 generates a sound the pitch of which is determined by the length, width, and thickness of flat 24 and tab 46. The brake drum has a bell-like effect on this sound so that the sound is magnified. The sound may also be conducted through the shoe and other parts of the vehicle to the operator. The vehicle operator will be aware of the noise generated by device 18 scraping against drum 68 when the brakes are applied and will be warned that the lining should be inspected and replaced. If, however, the operator ignores the signal and the lining is worn further, the back of lining 16 and the mounting plate 14 are moved closer to drum 68 upon additional brake applications until tab 46 lifts flat 22 away from engagement with the radially inner surface of mounting plate 14 and the spring vibrates at a pitch determined by the length, width, and thickness of flats 22, 24 and 26, with flat 34 remaining in tight engagement with mounting plate 14 and becoming the vibration fulcrum. This will result in a change in pitch of the noise generated by the spring as the lining continues to wear and will serve as a further warning to the vehicle operator.

Also, depending upon the amount of clearance between the lining 16 and the drum 68 when the brakes are retracted, and the length of tab 46, the tab 46 may engage the drum 68 when the brakes are not applied and therefore generate a continuous audible signal indicating that urgent attention to the brake lining is required. This signal will therefore be such that the vehicle operator cannot ignore it for any length of time, and the lining will be replaced in sufficient time to prevent damage to the vehicle brake system and for safety purposes.

The modification shown in FIGURE 6 substitutes a counterbore 164 for the aperture 64 in brake lining 16 so that the surface of lining 16 engaging drum 68 is not broken until the signal device should become operative. In this instance the neck 50 of tab 46 rests at the bottom of the counterbore 164 and the counterbore becomes an aperture extending through the lining when the lining has worn sufficiently far to remove the bottom of the counterbore. The device then becomes operative in the same general manner as described above.

I claim:

1. A brake lining wear warning device comprising a spring clip having means for securing said clip to a brake shoe and a cantilever spring end section adapted to extend through the brake lining to a depth equal to the predetermined lining thickness at which warning is to occur, said end section being engageable with the brake drum after the lining has been worn to the predetermined lining thickness to be caused to vibrate when the drum is rotating to generate a warning noise audible to the vehicle operator.

2. A brake lining wear warning clip comprising, a stamped spring body having a center fulcrum body section, laterally spaced fulcrum locating tabs formed on said center fulcrum section and extending substantially at right angles thereto, an end fulcrum body section longitudinally spaced from said center fulcrum body section, clip locating and retention tab means formed on said end fulcrum section, a brake lining wear sensitive body section adjacent and spaced from said center fulcrum body section and having a brake drum engageable vibratable end for vibrating said clip body about one of said fulcrum body sections when the brake drum is rotating and the brake lining has worn to permit engagement of said vibratable end with the brake drum.

3. In a brake assembly comprising, a brake drum, a brake shoe including a shoe web and a lining mounting plate and a brake lining on said mounting plate for controlled braking engagement with said drum; a brake lining wear warning device formed by a vibratable leaf spring having a section mounting said spring to said shoe and a spring vibration fulcrum section and a cantilever extending vibratable spring end section, said end section terminating with a tab extending through said lining mounting plate and into said lining a predetermined depth and engageable with said brake drum when said lining is sufficiently worn whereby said spring is caused to vibrate while said drum is rotating to generate an audible warning noise.

4. The structure defined by claim 3, said spring vibratable end section brake drum engageable tab including a shoulder portion engaging a portion of said shoe and a neck portion extending beyond said shoulder portion and into said lining wherein the length of said neck portion determines the lining wear thickness at which the warning commences.

5. The structure defined by claim 4, said shoulder portion engaging said brake lining.

6. The structure defined by claim 4, said shoulder portion engaging said lining mounting plate on the side thereof opposite said lining.

7. The structure defined by claim 3, said lining having a counterbore of a depth determining the lining thickness at which the audible warning noise is to be generated and receiving said vibratable spring end section tab, said tab being in spring biased engagement with the bottom of said counterbore until said lining is worn to the counterbore depth, said tab then extending through said lining to engage said brake drum.

8. A method of determining brake lining wear comprising the steps of initially engaging the brake drum with a vibratable member to generate a noise audible to the operator only after the lining has worn to a predetermined thickness and while the brake is engaged, and subsequently engaging the brake drum by the vibratable member upon additional lining wear when the brakes are disengaged as well as engaged to provide a continuous signal indicating further lining wear.

No references cited.